(12) United States Patent
Maynes et al.

(10) Patent No.: US 11,613,280 B2
(45) Date of Patent: *Mar. 28, 2023

(54) DEFLECTOR FOR VEHICLE

(71) Applicant: Deflect LLC, Kansas City, MO (US)

(72) Inventors: Spencer Wheatley Maynes, Kansas City, MO (US); Wayne Kennedy, Omaha, NE (US); Ren Hansen, Saratoga Springs, UT (US); Kevin Anthony Golsch, Howell, MI (US)

(73) Assignee: Deflect LLC, Kansas City, MO (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/318,283

(22) Filed: May 12, 2021

(65) Prior Publication Data

US 2021/0261173 A1   Aug. 26, 2021

Related U.S. Application Data

(63) Continuation of application No. 16/721,009, filed on Dec. 19, 2019, now Pat. No. 11,459,000.

(60) Provisional application No. 62/845,271, filed on May 8, 2019.

(51) Int. Cl.
*B61D 17/02*   (2006.01)

(52) U.S. Cl.
CPC .................... *B61D 17/02* (2013.01)

(58) Field of Classification Search
CPC .... B61D 17/02; B62D 35/001; B62D 35/005; B62D 35/007; B62D 35/008; B62D 37/02
See application file for complete search history.

(56) References Cited

U.S. PATENT DOCUMENTS

| | | |
|---|---|---|
| 2,243,906 A | 6/1941 | Huet |
| 3,904,236 A | 9/1975 | Johnson et al. |
| 4,509,786 A | 4/1985 | Gregg |
| 4,569,289 A | 2/1986 | Gielow et al. |
| 4,738,203 A | 4/1988 | Gielow et al. |
| 4,756,256 A | 7/1988 | Rains et al. |
| 4,858,988 A | 8/1989 | Morgan et al. |
| 5,039,156 A | 8/1991 | Messmore et al. |
| 5,280,990 A | 1/1994 | Rinard |
| 5,513,894 A | 5/1996 | Ragsdale |
| 5,546,865 A | 8/1996 | Haentjens et al. |
| 6,669,270 B1 | 12/2003 | Card et al. |
| 8,651,554 B1 | 2/2014 | Patelczyk et al. |
| 11,459,000 B2 * | 10/2022 | Maynes ............... B61D 17/02 |
| 2009/0236872 A1 | 9/2009 | Wood |
| 2010/0194144 A1 | 8/2010 | Sinha |
| 2010/0231008 A1 | 9/2010 | Bergmiller |
| 2011/0115254 A1 | 5/2011 | Skopic |
| 2011/0253002 A1 | 10/2011 | Sun et al. |
| 2014/0076419 A1 | 3/2014 | Sinha |

(Continued)

FOREIGN PATENT DOCUMENTS

| | | |
|---|---|---|
| AU | 1989036051 | 12/1989 |
| CN | 102951166 A | 3/2013 |
| WO | 2014022058 | 2/2014 |

*Primary Examiner* — Robert J McGarry, Jr.
(74) *Attorney, Agent, or Firm* — Fresh IP PLC; John R. Bednarz (57) ABSTRACT

A deflector for use with railcars and containers. The deflector may be used to retrofit railcars and other container to reduce aerodynamic drag. The deflector may be collapsible for use with stacked containers.

19 Claims, 9 Drawing Sheets

(56) References Cited

U.S. PATENT DOCUMENTS

2017/0066486 A1    3/2017    Malone et al.
2018/0178859 A1    6/2018    Sandgren \* cited by examiner

DEFLECTOR FOR VEHICLE

CROSS REFERENCE TO RELATED APPLICATION

This application is a continuation of U.S. patent application Ser. No. 16/721,009 filed Dec. 19, 2019 entitled "Deflector for Vehicle," which claims priority from U.S. Application No. 62/845,271 filed on May 8, 2019, entitled "Railcar and Container Deflector," the entire contents of which is hereby incorporated by reference.

FIELD

The present disclosure relates to a deflector for use with railcars and containers. More particularly, it concerns a deflector that can be used to retrofit railcars to reduce aerodynamic drag.

BACKGROUND

Intermodal shipping containers are ubiquitous in industry. Their large capacity and ability to stack on top of each other make them ideal for transporting large quantities of products. Unfortunately, the rectangular shape of the container, although useful for maximizing capacity and stacking capability, is not aerodynamically efficient. When transported by train, the gap in between the train cars causes much of this aerodynamic resistance. This inefficiency requires consumption of more fuel to move the container, leading to increased transport costs, increased pollution, reductions in train velocity, and other issues.

Reducing the amount of drag produced by the shipping containers is no simple task. Redesigning the whole container would be costly and may require new infrastructure to accommodate the new container design; moreover, it may affect the container's capacity or stacking capabilities. Modifying an existing container presents similar challenges: piercing or welding the container may reduce the container's capacity or expose its contents to the environment. Installing a device or changing the shape of the top of the container may reduce, or altogether remove, the container's ability to stack. Furthermore, an installed device must be able to withstand the environmental conditions to which shipping containers are subjected, particularly wind, rain, and UV exposure. Installing a flexible device to cover the intercar gap on trains is generally impractical, as the gap allows for a wider turn radius and easier coupler access. Further, such a device would be cumbersome because cars are often switched between trains.

What is needed is a device that provides an effective way to reduce drag without sacrificing the container's ability to stack, reducing the container's capacity, or modifying the container's original design.

Various objects, features and advantages of this disclosure will become apparent from the following detailed description, which, taken in conjunction with the accompanying drawings, which depict, by way of illustration and example, certain embodiments of this deflector for intermodal containers and railcars.

SUMMARY

The present disclosure provides a deflector for use with railcars and containers. The deflector can be used to retrofit intermodal containers to reduce aerodynamic drag and/or pressure drag on intermodal containers. The deflector may be collapsible and may also have shape memory properties. The deflector may be permanently attached to a surface of the intermodal container. The deflector may be removably attached to one or more surfaces of an intermodal container.

As an example, the deflector for use with an intermodal container may have a base. The base may a top surface and a bottom surface. The top surface and the bottom surface may be opposite one another. The bottom surface may be configured to be attached to a surface of the intermodal container. The deflector may also have a sidewall. The sidewall may comprise an inner surface and an outer surface opposite the inner surface. The sidewall may be collapsible. The deflector may also have a first end and a second end opposite the first end. The deflector may also have a top wall that is connected to the base and the sidewall. The top wall, the base, and the sidewall may be connected to one another to form a triangular prism shape or a wedge shape. The base may be connected to the sidewall to form an internal volume. The base, sidewall, and top wall may be connected to form an internal volume. The internal volume may be divided by a divider. The internal volume may be hollow. The internal volume may be filled. The base may be formed from a continuous material. The top wall may be formed from a continuous material. The sidewall may be formed from a continuous material. The deflector may also have a bonding complex. The bonding complex may have one or more adhesive layers. The bonding complex may also have a foam layer. The sidewall of the deflector may be curved. The top wall of the deflector may be curved. The deflector may be formed from a shape memory material. The shape memory material may be ethylene propylene diene (EPDM) rubber. The top wall, the base, the sidewall, and the divider may be removably attached to one another. The adhesive complex may be permanent to permanently attach the deflector to a surface of the intermodal container. The adhesive complex may be temporary to temporarily or removably attach the deflector to a surface of the intermodal container. A portion of the first or second end of the deflector may be partially sealed. A portion of the first or second end of the deflector may be partially unsealed.

As another example, the deflector for use with an intermodal container may have a base. The base may a top surface and a bottom surface. The top surface and the bottom surface may be opposite one another. The bottom surface may be configured to be attached to a surface of the intermodal container. The deflector may also have a sidewall. The sidewall may comprise an inner surface and an outer surface opposite the inner surface. The sidewall may be collapsible. The deflector may have a divider. The divider may have a top edge and a bottom edge. The top edge of the divider may be attached to the inner surface of the top wall and the bottom edge may be attached to the top surface of the base. The deflector may also have a first end and a second end opposite the first end. The first end may be partially unsealed. The deflector may also have a bonding complex to permanently bond the deflector to a top surface of an intermodal container. The top wall, the base, and the sidewall may be connected to one another to form a triangular prism shape or a wedge shape. The inner surface of the top wall, the inner surface of the sidewall, and the top surface of the base may define an internal volume. The internal volume may be bisected by the divider. The deflector may be formed from a shape memory material comprising ethylene propylene diene rubber. The deflector is collapsible when a sufficient weight is placed on the deflector. The deflector returns to an expanded configuration when the sufficient weight is removed from the deflector.

Drag pressure on intermodal containers may be reduced by providing a deflector and attaching the deflector to a surface of an intermodal container. The deflector may be placed on a top surface of the intermodal container. The deflector may have a base. The base may a top surface and a bottom surface. The top surface and the bottom surface may be opposite one another. The bottom surface may be configured to be attached to a surface of the intermodal container. The deflector may also have a sidewall. The sidewall may comprise an inner surface and an outer surface opposite the inner surface. The sidewall may be collapsible. The deflector may have a divider. The divider may have a top edge and a bottom edge. The top edge of the divider may be attached to the inner surface of the top wall and the bottom edge may be attached to the top surface of the base. The deflector may also have a first end and a second end opposite the first end. The first end may be partially unsealed. The deflector may also have a bonding complex to permanently bond the deflector to a top surface of an intermodal container. The top wall, the base, and the sidewall may be connected to one another to form a triangular prism shape or a wedge shape. The inner surface of the top wall, the inner surface of the sidewall, and the top surface of the base may define an internal volume. The internal volume may be bisected by the divider. The deflector may be formed from a shape memory material comprising ethylene propylene diene rubber. The deflector is collapsible when a sufficient weight is placed on the deflector. The deflector returns to an expanded configuration when the sufficient weight is removed from the deflector.

Various objects, features and advantages of this disclosure will become apparent from the following detailed description, which, taken in conjunction with the accompanying drawings, which depict, by way of illustration and example, certain embodiments of this deflector for intermodal container.

BRIEF DESCRIPTION OF THE DRAWINGS

In order to describe the manner in which the advantages and features of the present inventive concept can be obtained, reference is made to embodiments thereof which are illustrated in the appended drawings. Understanding that these drawings depict only exemplary embodiments of the present inventive concept and are not, therefore, to be considered to be limiting of its scope, the principles herein are described and explained with additional specificity and detail through the use of the accompanying drawings in which:

FIGS. 1 A-C are perspective views of a deflector in accordance with the disclosure.

DETAILED DESCRIPTION

Figure 1A:
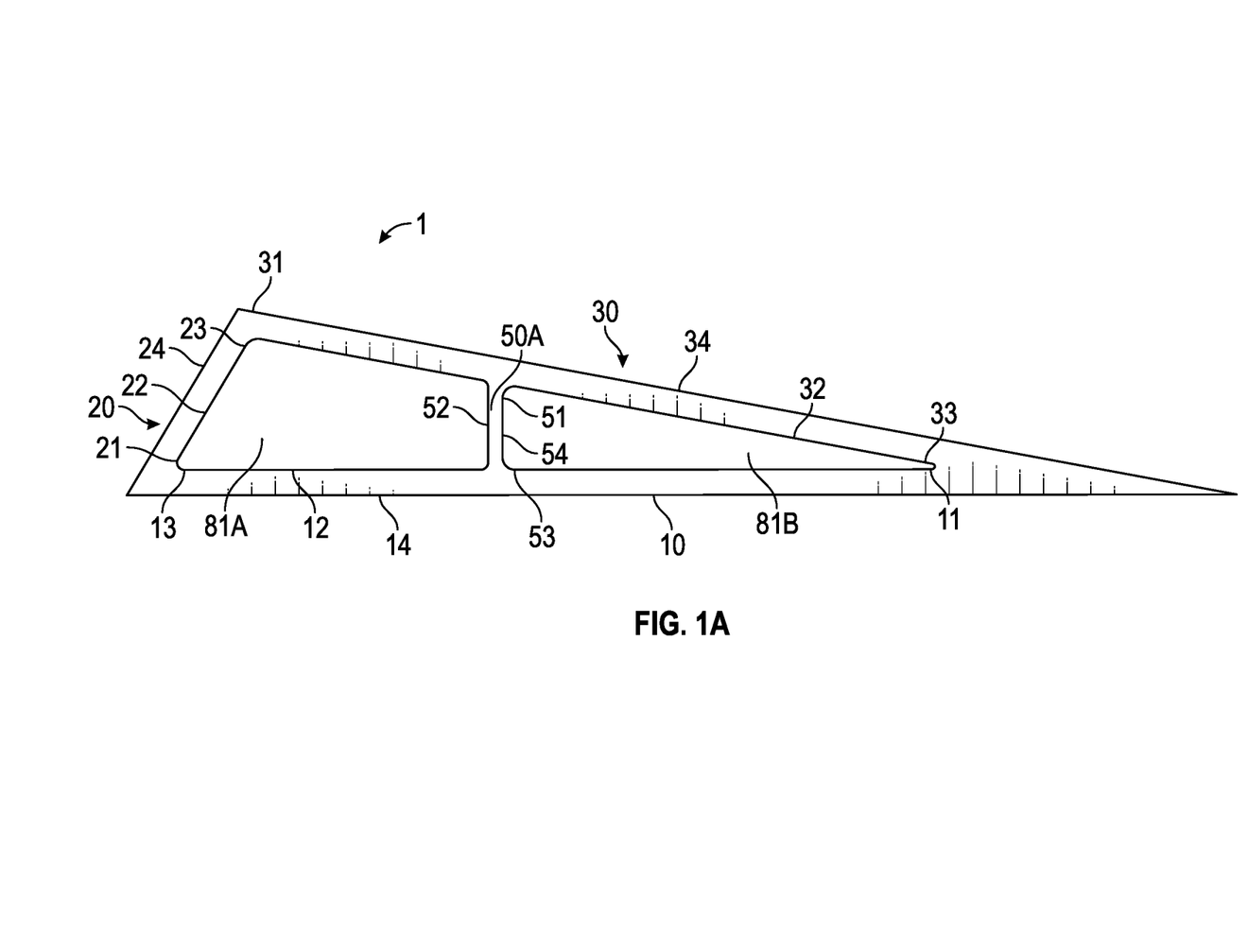

A deflector for use with railcars and intermodal containers according to the present disclosure is generally designated by the reference numeral 1 and is shown in FIG. 1A in an exemplary installation on one type of deflector 1. The deflector 1 is depicted in an expanded configuration. The deflector disclosed herein provides benefit of deflecting air as railcars move. The deflector also provides the benefit of being collapsible, allowing for less expensive shipping.

FIGS. 1-8 depict an embodiment of the deflector 1. As shown in FIGS. 1A-C, the deflector has a base 10 that supports the deflector 1. The deflector 1 also has a sidewall 30 connected to the base 10. The deflector 1 also has a top wall 30 connected to the base 10 and the sidewall. In this regard, the base 10, sidewall 20, and top wall 30 are connected to one another to form a triangular prism that defines an internal volume 80. As shown in FIG. 1A, the internal volume 80 may be bisected by a divider 50 A-C to form a first sub-internal volume 81A and a second sub-internal volume 81B. The deflector 1 may have a first end 2 opposite a second end 3.

Figure 1B:
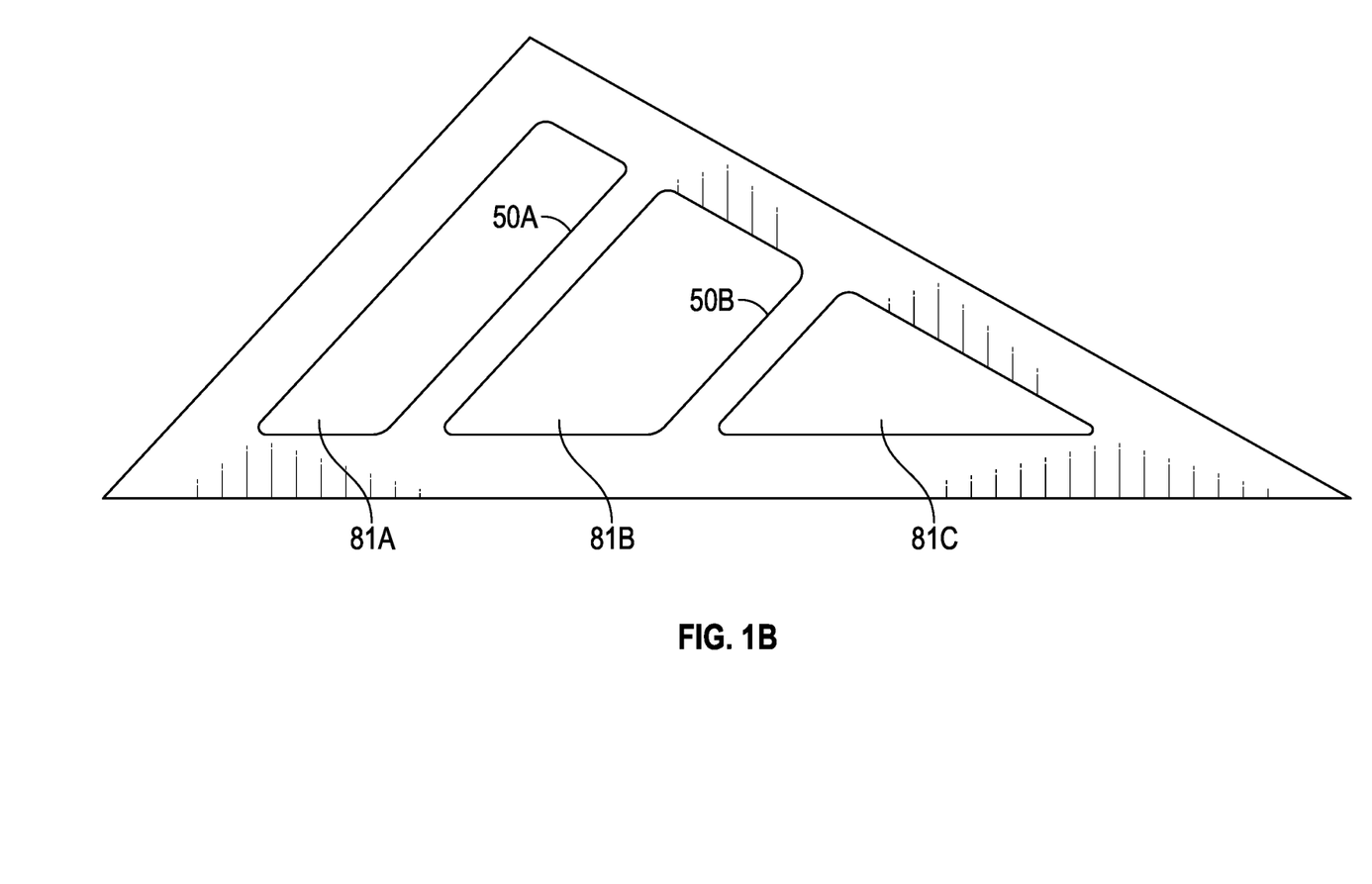
Figure 1C:
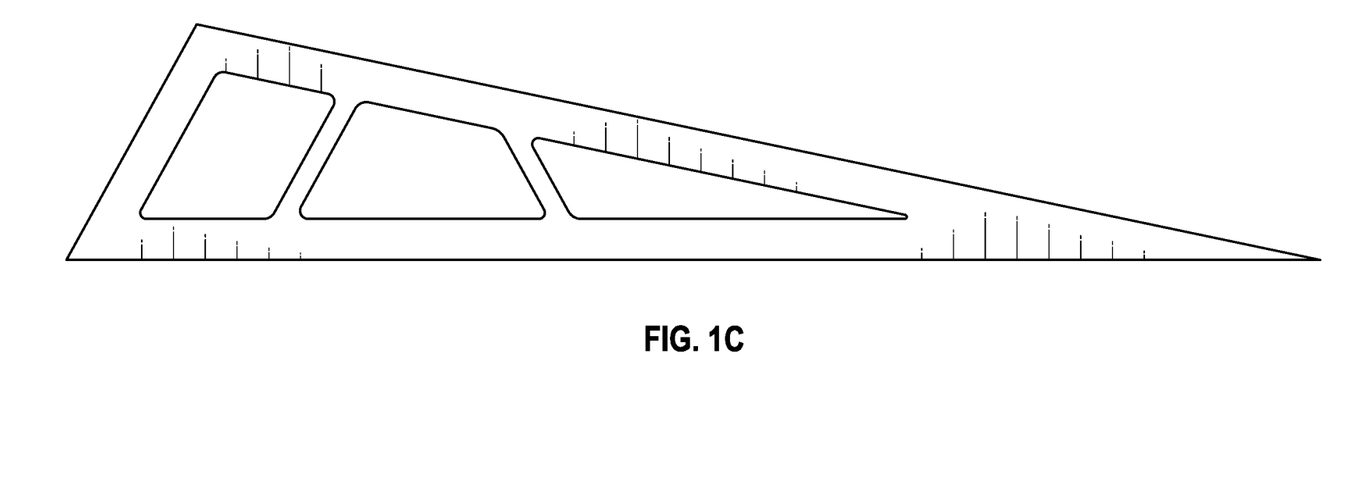

As shown in FIGS. 1A-C, the base 10 of the deflector 1 has a top surface 12 and a bottom surface 14 opposite the top surface 12. The top surface 12 of the base 10 faces the internal volume 80. The base 10 may have a rectangular shape. In this regard, the base 10 may have a first edge 11 opposite a second edge 13. The first edge 11 is configured to be attached to the top wall 30. The second edge 13 is configured to be attached to the sidewall 20.

The base 10 has a width and a length. The width of the base 10 may be one inch. As a non-limiting example, the base 10 may have a width less or more than one inch. The base 10 may be rectangle. The base 10 may be other shapes such as square. The base 10 may be one inch thick. In another example, the base 10 may be less than one inch thick. In another example, the base 10 may be more than one inch thick.

As shown in FIGS. 1A-C, the sidewall 20 of the deflector 1 has an inner surface 22 and an outer surface 24 opposite the inner surface 22. The inner surface 22 of the sidewall 20 faces the internal volume 80. The sidewall 20 may have a rectangular shape. In this regard, the sidewall 20 may have a first edge 21 opposite a second edge 23. The first edge 21 is configured to be attached to the base 10. The second edge 23 is configured to be attached to the top wall 30.

Figure 3:
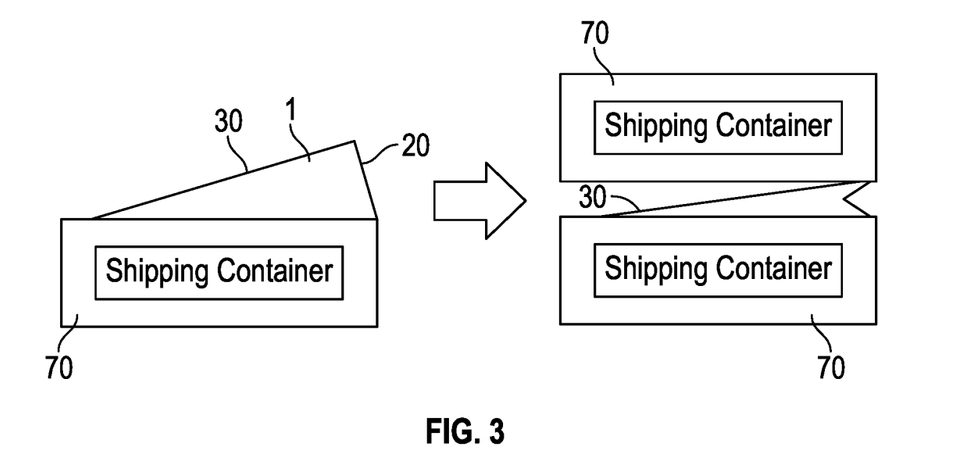
FIG. 3 is a side view of the deflector shown in association with an intermodal container.
Figure 4:
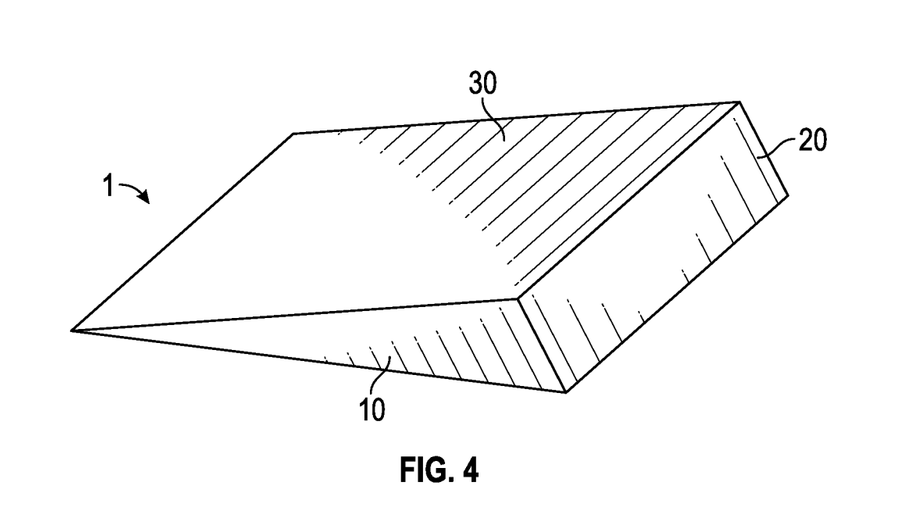
FIG. 4 is a perspective view of the deflector.

The sidewall 20 has a width and a length. The width of the sidewall 20 may be one inch. As a non-limiting example, the sidewall 20 may have a width less or more than one inch. The sidewall 20 may be rectangle. The sidewall 20 may be other shapes such as square. The sidewall 20 may be curved. As an example, the sidewall 20 may be convex. As another example, the sidewall 20 may be concave. The sidewall 20 may be one inch thick. In another example, the sidewall 20 may be less than one inch thick. In another example, the sidewall 20 may be more than one inch thick. The deflector 1 may be collapsible. In this regard, the sidewall 20 may be configured to collapse when a sufficient amount of weight is placed on the deflector 1. As an example, as shown in FIG. 3, when an intermodal container 70 is placed on top of the deflector 1, the deflector 1 may collapse. Because the sidewall 20 is collapsible, the sidewall 20 may have pleats similar to an accordion. In another example, the sidewall 20 may have a notch 29 or area that is less thick than the rest of the sidewall 20, providing a location where the sidewall 20 may fold inward or fold outward with respect to the sub-volume 81A. Similarly, the top wall 30 may have a notch or area that is less thick than the rest of the top wall 30, providing a location where the top wall 30 may fold inward with respect to the internal sub-volumes 81 A-C. It should be appreciated that any of the base 10, sidewall 20, top wall 30, or the dividers 50 A-C may have a notch or area that is less thick than the rest of the base 10, sidewall 20, top wall 30, or the dividers 50 A-C, providing a location where the base 10, sidewall 20, top wall 30, or the dividers 50 A-C may fold inward or outward with respect to the internal sub-volumes 81 A-C. In some examples, the deflector 1 may be used with railcars or intermodal containers that are not stacked. In such examples, the deflector 1 may not be collapsible. In non-collapsible examples, the deflector 1, may be formed from a hard plastic.

As shown in FIGS. 1A-C, the top wall 30 of the deflector 1 has an inner surface 32 and an outer surface 34 opposite the inner surface 32. The inner surface 32 of the top wall 30 faces the internal volume 80. The top wall 30 may have a rectangular shape. In this regard, the top wall 30 may have a first edge 31 opposite a second edge 33. The first edge 31 is configured to be attached to the sidewall 20. The second edge 33 is configured to be attached to the base 10.

The top wall 30 has a width and a length. The width of the top wall 30 may be one inch. As a non-limiting example, the top wall 30 may have a width less or more than one inch. As shown, in FIG. 3, the top wall 30 may be rectangle. The top wall 30 may be other shapes such as square. The top wall 30 may be curved. As an example, the top wall 30 may be convex. As another example, the top wall 30 may be concave. The top wall 30 may be one inch thick. In another example, the top wall 30 may be less than one inch thick. In another example, the top wall 30 may be more than one inch thick.

The base 10, side wall, and top wall 30 are connected to one another. The second edge 13 of the base 10 is connected to the first edge 21 of the sidewall 20. The second edge 23 of the sidewall 20 is connected to the first edge 31 of the top wall 30. The second edge 33 of the top wall 30 is connected to the first edge 11 of the base 10. In this regard, the base 10, sidewall 20, and top wall 30 are connected to one another to form a triangular prism. The edges that are connected to one another may be permanently attached to one another. In another example, the edges may also be removably attached to one another. One of skill in the art will appreciate that the deflector 1 may have more than three walls to form other shapes such as cube, rectangular prism, or any other shape known in the art.

As shown in FIG. 1A, the divider 50A bisecting the internal volume 80 has a first side surface 52 opposite a second side 54. The divider has as top edge 51 and a bottom edge 53 opposite the top edge 51. The top edge 51 is attached to the inner surface of the top wall 30. The bottom edge 53 of the divider is connected to the top surface 12 of the base 10. In this regard, the divider 50 A divides the internal volume 80 into a first sub volume 81A and a second sub volume 81B. It should be appreciated that, as shown in FIGS. 1 B-C, the deflector 1 may have more than one divider 50 A-C. It should also be appreciated that, as shown in FIG. 1B, the deflector 1 may have more than one sub-volume 81 A-C. Each of the sub-volumes 81 A-C may be hollow. In some examples, one or all of the sub-volumes may be filled with a suitable material. The suitable material used for filing the sub-volumes 81 A-C may be the same material as the base 10, sidewall 20, and top wall 30. The sub-volumes 81 AB may also be filled with a material that is different from the material used to form the base 10, sidewall 20, and top wall 30. In some examples, each sub-volume 81 A-C is filled with the same material. In other examples, each sub-volume 81 A-C is filled with a different material from the other sub-volumes 81 A-C. In some examples, each sub-volume 81 A-C is filled. In other examples, at least one sub-volume 81 A-C is filled and the other sub-volumes 81 A-C are not filled. As shown in FIG. 1A, the divider 50 A is perpendicular to the base 10. In another example, as shown in FIGS. 1B-1C, the divider 50 A-C may be slanted or non-perpendicular in relation to the base 10.

Figure 7:
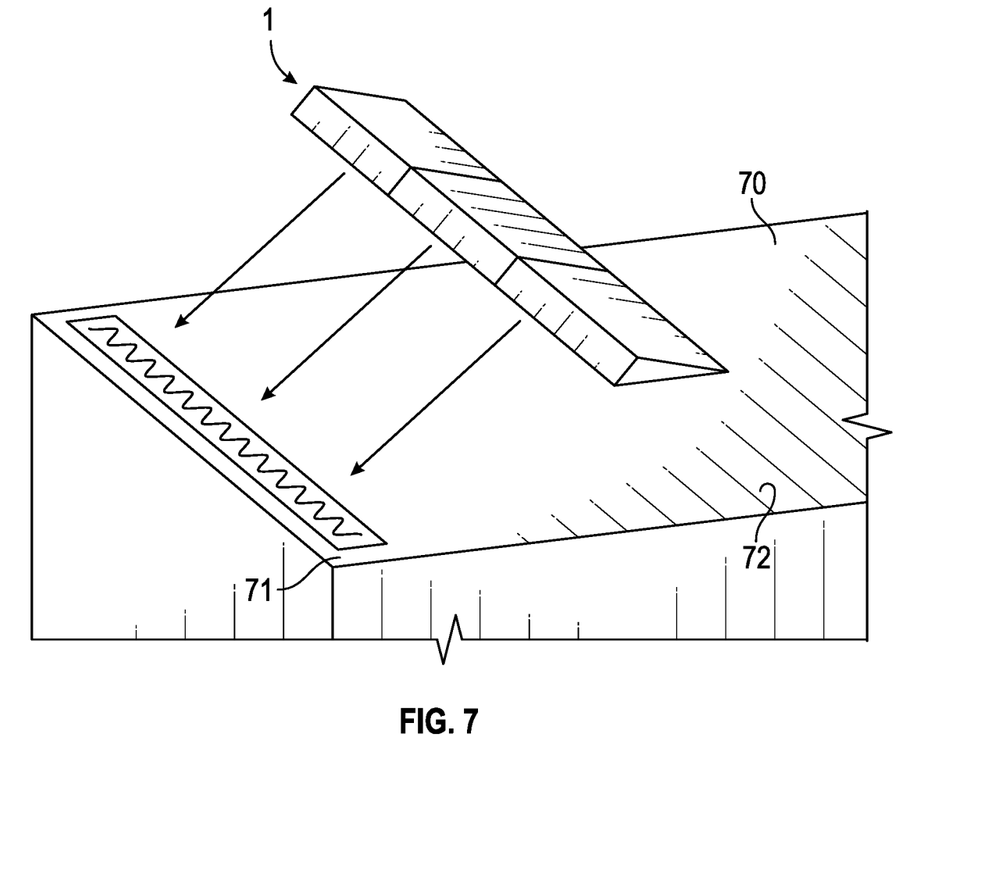
FIG. 7 is a perspective view of the deflector shown in association with an intermodal container.
Figure 8:
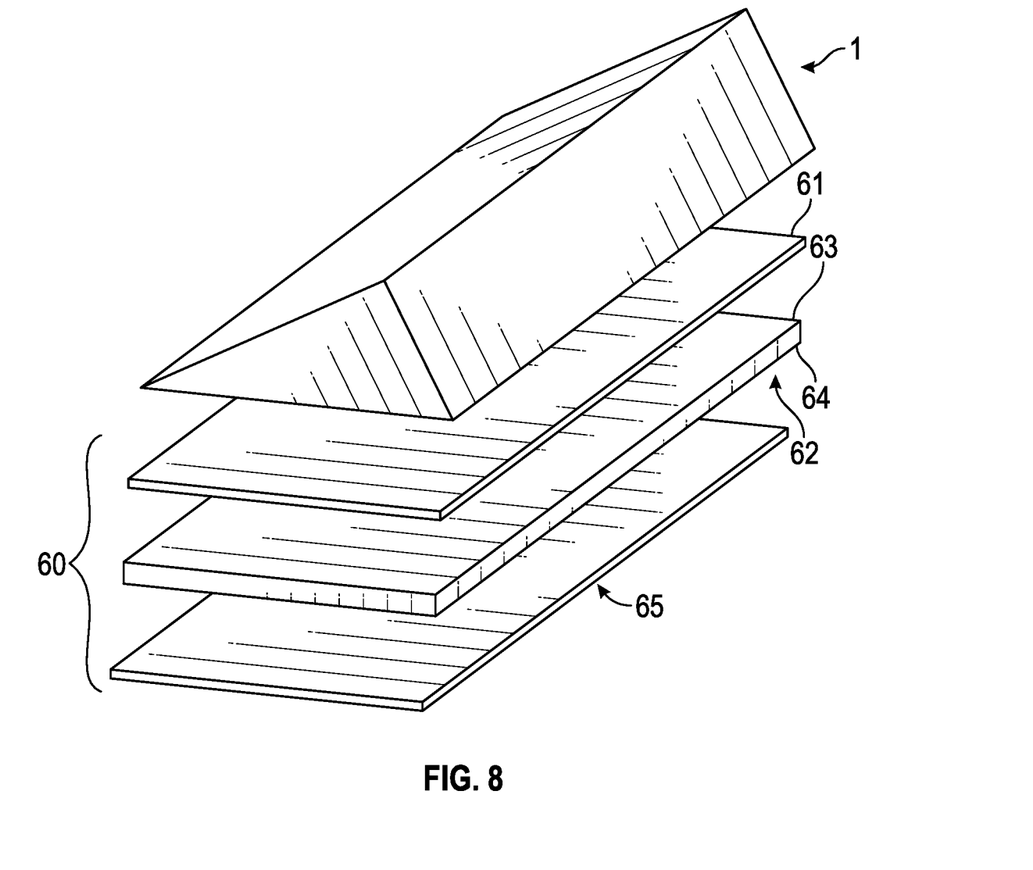
FIG. 8 is a perspective view of the deflector and the bonding complex shown in association with an intermodal container.

As shown in FIGS. 7 and 8, one or both of the first end 2 or the second end 3 may be sealed or closed. This may assist in reducing pressure drag on the intermodal container 70. As shown in FIG. 1, the one or both of the first end 2 or the second end 3 of the deflector 1 may be open. In some examples, one or both of the first end 2 or the second end 3 may be tapered.

As shown in FIG. 8, the deflector 1 may include a bonding complex 60. The bonding complex 60 may have a first adhesive layer 61 and a second adhesive layer 65. The bonding complex 60 may also include a foam layer 62. The foam layer 62 may have a top foam surface 63 and a bottom foam surface 64 opposite the top foam surface. The first adhesive may be applied to the top foam surface 64. The foam layer 62 may provide added durability to the deflector 1 when the deflector 1 is attached to an intermodal container. The second adhesive may be applied to the bottom foam surface 65. The bonding complex 60 may be used to attach the deflector 1 to a surface of an intermodal container 70.

As shown in FIGS. 2, 3, 6, and 7, the bonding complex 60 may be used to attach the deflector 1 to the top surface 72 of an intermodal container 70. As shown, the deflector 1 may be attached to the top surface 72 of an intermodal container 70 near the first end 71 or the second end 73 of the intermodal container 70. In some examples, the deflector 1 may be attached to one or more side surface 74AB of the intermodal container 70. In another example, more than one deflector 1 may be attached to the intermodal container 70. It should be appreciated that the deflector 1 may be used to reduce pressure drag on any type of railway vehicle known in the art, including, but not limited to passenger railcars, freight containers, ancillary vehicles, military railway vehicles, and maintenance vehicles. It should also be appreciated that the deflector 1 may be used on any type of freight container, including, but not limited, to container railway vehicles, bulk freight railway vehicles, specialist use railway vehicles, and multi-modal railway vehicles. The multi-modal vehicles may include, but are not limited to, road-railer, modalohr road trailer carriers, well car, and intermodal cars such as bulk freezing containers, flat rack containers, insulated containers, refrigerated containers, open top containers, custom containers, and any other container known in the art. It should also be appreciated that the deflector 1 may be used for decreasing pressure drag on containers transported by other means such as by road or by sea.

Figure 2:
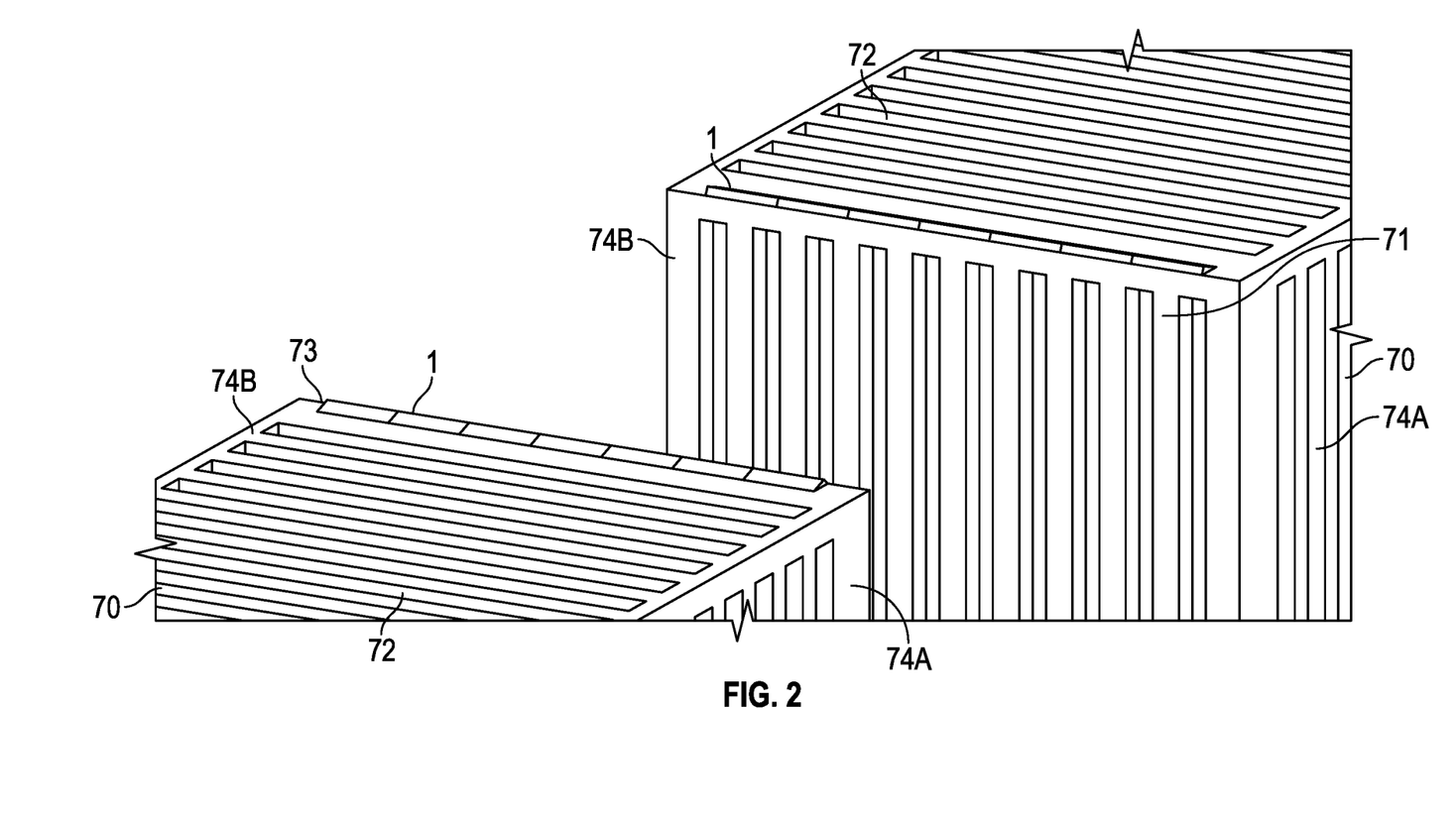
FIG. 2 is a perspective view of the deflector shown in association with an intermodal container.

Because the deflector 1 may be used to retrofit an intermodal container 70, the deflector 1 may have a length appropriate to extend almost the entire width of the intermodal container 70. As an example, the deflector 1 may have a length up to 9 feet. An advantage of the deflector 1 is the ability to collapse or deform under a sufficient weight and return to the original shape once the weight is removed. As shown in FIG. 2, the deflector 1 may be used with stackable intermodal containers. When stackable intermodal containers 70 are stacked there may be a gap between the intermodal containers. The deflector 1 is configured to collapse to a height small enough to fit between stacked intermodal containers 70 without damaging the deflector 1 or the intermodal container 70. In this regard, the deflector 1 may have a one inch height when in an expanded configuration and have a collapsed height that is 0.5 inches or less, as shown in FIG. 3. In some examples, the deflector 1 may have a collapsed height of 0.4 inches or less. In other examples, the deflector 1 may have a collapsed height that is more than 0.5 inches. It should be appreciated that the deflector 1 may have a height in an expanded configuration that is more than one inch. Because the deflector 1 may be attached to a flat surface or a non-flat surface, the base 10, side wall 20, top wall 30, and bonding complex 60 may be flexible to conform to a non-flat surface.

Figure 5:
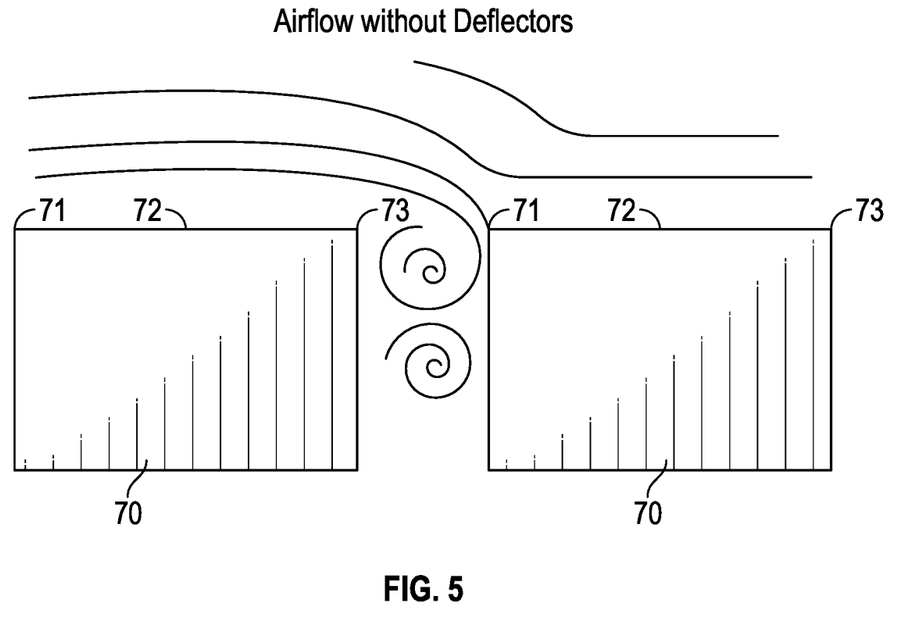
FIG. 5 is a side view of an intermodal container without a deflector.
Figure 6:
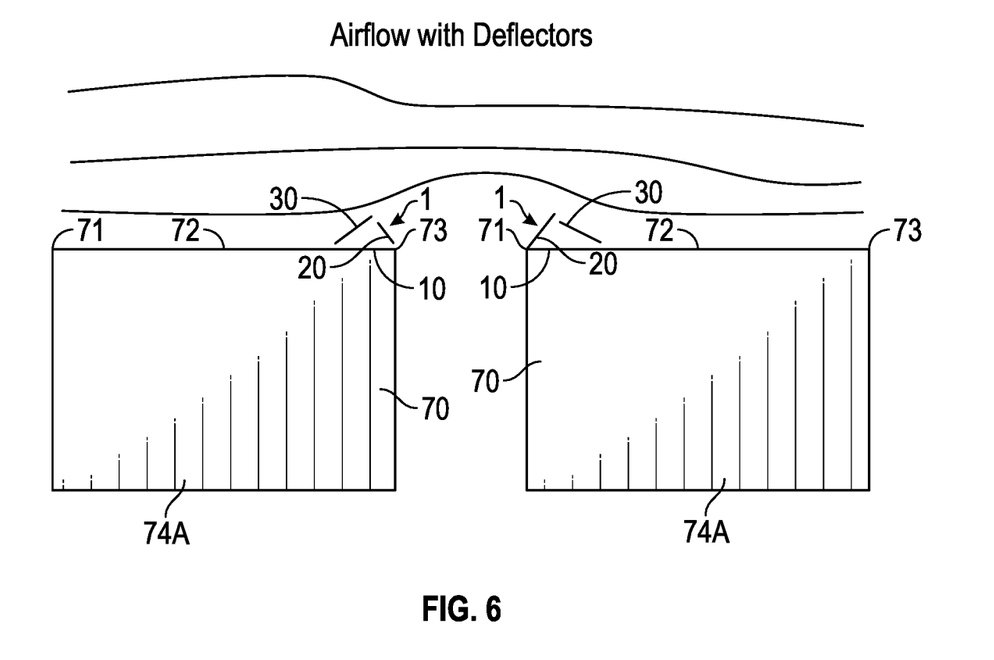
FIG. 6 is a side view of the deflector shown in association with an intermodal container.

In use, the deflector 1 is installed on an intermodal container 70 by attaching the first adhesive 61 of the bonding complex 60 to the bottom surface 14 of the base 10. The top surface 63 of foam layer 62 may be attached to the first adhesive 61. The bottom surface 64 of foam layer 62 may be attached to the second adhesive 65. The second adhesive 65 may be attached to a top surface 72 of the intermodal container 70. In another example, the second adhesive 65 may be attached to a side surface 74AB of the intermodal container 70. As shown in FIG. 6, once the deflector 1 is attached to the intermodal container 70, the deflector 1 may reduce pressure drag on an intermodal container behind the deflector 1 by forcing airflow over a gap between. As shown in FIG. 5, intermodal containers 70 transported without deflectors 1 may be impacted by pressure drag. The deflector 1 does not significantly increase downforce.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A deflector comprising:
a base comprising: a top surface and a bottom surface, the bottom surface configured to be a surface of a vehicle;
a sidewall comprising: an inner surface and an outer surface opposite the inner surface, wherein the sidewall is collapsible;
a first end; and
a second end.

2. The deflector of claim 1, further comprising a top wall, wherein the top wall is connected to the base and the sidewall.

3. The deflector of claim 2, wherein the top wall, the base, and the sidewall are connected to form a triangular prism shape.

4. The deflector of claim 1, wherein the base is connected to the sidewall to form an internal volume.

5. The deflector of claim 4, further comprising a divider, wherein the divider bisects the internal volume.

6. The deflector of claim 4, wherein the internal volume is filled.

7. The deflector of claim 2, wherein at least one of the base, the top wall, and the sidewall is formed from a continuous material.

8. The deflector of claim 2, further comprising a bonding complex, the bonding complex comprising an adhesive layer.

9. The deflector of claim 8, wherein the bonding complex further comprises a foam layer.

10. The deflector of claim 2, wherein at least one of the top wall and the sidewall is curved.

11. The deflector of claim 1, wherein the deflector is formed from a shape memory material comprising ethylene propylene diene rubber.

12. The deflector of claim 1, wherein the vehicle is a railway vehicle.

13. The deflector of claim 5, wherein the top wall, the base, the sidewall, and the divider are removably attached to one another.

14. The deflector of claim 8, wherein the deflector is configured to be the surface of the vehicle.

15. The deflector of claim 1, wherein at least a portion of the first end and the second end are unsealed.

16. The deflector of claim 1, wherein the first end and the second end are sealed.

17. A deflector comprising:
a base comprising: a top surface and a bottom surface, the bottom surface configured to be a top surface of a railway vehicle;
a sidewall comprising: an inner surface and an outer surface opposite the inner surface, wherein the sidewall is collapsible;
a top wall comprising an inner surface and an outer surface;
a divider, wherein the divider has a top edge and a bottom edge, wherein the top edge is attached to the inner surface of the top wall and the bottom edge is attached to the top surface of the base;
a first end, wherein at least a portion of the first end is unsealed; and
a second end, wherein at least a portion of the second end is unsealed,
wherein the top wall, the base, and the sidewall are connected to form a triangular prism shape,
wherein the inner surface of the top wall, the inner surface of the sidewall, and the top surface of the base define an internal volume,
wherein the divider bisects the internal volume,
wherein the deflector is formed from a shape memory material comprising ethylene propylene diene rubber,
wherein the deflector is collapsible when a sufficient weight is placed on the deflector, and
wherein the deflector returns to an expanded configuration when the sufficient weight is removed from the deflector.

18. A method of reducing pressure drag, the method comprising:
providing a deflector, the deflector comprising:
a base comprising: a top surface and a bottom surface, the bottom surface configured to be a surface of a railway vehicle;
a sidewall comprising: an inner surface and an outer surface opposite the inner surface, wherein the sidewall is collapsible;
a top wall comprising an inner surface and an outer surface;
a divider;
a first end, wherein at least a portion of the first end is unsealed; and
a second end, wherein at least a portion of the second end is unsealed,
wherein the top wall, the base, and the sidewall are connected to form a triangular prism shape, wherein the inner surface of the top wall, the inner surface of the sidewall, and the top surface of the base define an internal volume,
wherein the divider bisects the internal volume, and
wherein the deflector is formed from a shape memory material comprising ethylene propylene diene rubber.

19. The method of claim 18, wherein the deflector comprises a top surface of the railway vehicle.

\* \* \* \* \*